(12) United States Patent
Masunaga et al.

(10) Patent No.: US 10,020,887 B2
(45) Date of Patent: Jul. 10, 2018

(54) WIRELESS COMMUNICATION SYSTEM, BASEBAND PROCESSING DEVICE, AND WIRELESS DEVICE

(71) Applicant: FUJITSU LIMITED, Kawasaki-shi, Kanagawa (JP)

(72) Inventors: Daisuke Masunaga, Sendai (JP); Akira Toyomane, Sendai (JP); Katsutoshi Usami, Sendai (JP); Masaaki Okada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/418,267

(22) Filed: Jan. 27, 2017

(65) Prior Publication Data

US 2017/0141850 A1 May 18, 2017

Related U.S. Application Data

(63) Continuation of application No. 14/827,040, filed on Aug. 14, 2015.

(30) Foreign Application Priority Data

Oct. 16, 2014 (JP) .................................. 2014-212086

(51) Int. Cl.
*H04B 10/2575* (2013.01)
*H04B 10/2507* (2013.01)
(Continued)

(52) U.S. Cl.
CPC ... *H04B 10/2507* (2013.01); *H04B 10/25753* (2013.01); *H04B 10/5057* (2013.01); *H04B 10/697* (2013.01); *H04B 2210/254* (2013.01)

(58) Field of Classification Search
CPC .................... H04B 10/2507–10/25753; H04B 10/5057–10/50593; H04B 10/58;
(Continued)

(56) References Cited

U.S. PATENT DOCUMENTS

| 7,058,311 B1* | 6/2006 | Islam ............... H04B 10/25133 398/140 |
| 2002/0012493 A1* | 1/2002 | Newell .................. B82Y 15/00 385/24 |

(Continued)

FOREIGN PATENT DOCUMENTS

| JP | 2007-096775 A | 4/2007 |
| JP | 2008-058320 A | 3/2008 |

(Continued)

*Primary Examiner* — Li Liu
(74) *Attorney, Agent, or Firm* — Arent Fox LLP

(57) ABSTRACT

A wireless communication system includes a baseband processing device configured to transmit a data signal via an optical transmission line, and a wireless device configured to receive the data signal via the optical transmission line and carry out wireless transmission of an output signal obtained by amplifying the data signal, wherein the wireless device is configured to amplify the data signal to generate the output signal, generate a feedback signal according to the output signal, and transmit the feedback signal to the baseband processing device via the optical transmission line, and wherein the baseband processing device is configured to acquire the feedback signal from the wireless device, and execute first processing of multiplying the data signal by a distortion compensation coefficient corresponding to an inverse characteristic of distortion in the radio frequency circuit based on the feedback signal.

15 Claims, 16 Drawing Sheets

(51) Int. Cl.
*H04B 10/69* (2013.01)
*H04B 10/50* (2013.01)

(58) Field of Classification Search
CPC .............. H04B 10/6163; H04B 10/697; H04B 2210/25; H04B 2210/254
USPC ......... 398/115, 116, 158–162, 192–201, 213
See application file for complete search history.

(56) References Cited

U.S. PATENT DOCUMENTS

| | | | | |
|---|---|---|---|---|
| 2002/0063934 A1* | 5/2002 | Sakauchi | ........... | H04B 10/2513 398/141 |
| 2002/0159118 A1* | 10/2002 | Hiramatsu | ............. | H01Q 1/246 398/101 |
| 2004/0197103 A1* | 10/2004 | Roberts | .............. | H04B 10/2543 398/159 |
| 2006/0079290 A1* | 4/2006 | Seto | ..................... | H01Q 3/2605 455/562.1 |
| 2007/0072646 A1* | 3/2007 | Kuwahara | ........... | H04W 88/085 455/561 |
| 2009/0291681 A1 | 11/2009 | Hara | | |
| 2012/0039415 A1* | 2/2012 | Matsubara | .............. | H04L 27/20 375/296 |
| 2012/0147991 A1* | 6/2012 | Matsubara | ............. | H03F 1/3241 375/296 |
| 2012/0313817 A1 | 12/2012 | Underbrink et al. | | |
| 2013/0243125 A1* | 9/2013 | Matsubara | ................ | H04B 1/62 375/297 |
| 2014/0146910 A1* | 5/2014 | Matsubara | ........... | H04B 1/0475 375/285 |

FOREIGN PATENT DOCUMENTS

JP 2009-284066 A 12/2009
JP 2010-068133 A 3/2010

* cited by examiner

WIRELESS COMMUNICATION SYSTEM, BASEBAND PROCESSING DEVICE, AND WIRELESS DEVICE

CROSS-REFERENCE TO RELATED APPLICATIONS

This application is a Continuation of U.S. patent application Ser. No. 14/827,040, filed Aug. 14, 2015, which claims priority to Japanese Patent Application No. 2014-212086, filed Oct. 16, 2014. The disclosures of the priority applications are incorporated in their entirety herein by reference.

FIELD

The embodiments discussed herein are related to a wireless communication system, a baseband processing device, and a wireless device.

BACKGROUND

Conventionally, wireless base station devices (hereinafter, often referred to simply as the "base station") are provided with an amplifying unit that amplifies the power of a transmission signal. In general, in the base station, the amplifying unit is operated near the saturation region of the amplifying unit in order to enhance the power efficiency of the amplifying unit. However, when the amplifying unit is operated near the saturation region, non-linear distortion increases. Therefore, in order to suppress this non-linear distortion and reduce the adjacent channel leakage ratio (ACLR), the base station is provided with a distortion compensating unit that compensates for the non-linear distortion.

As one of distortion compensation systems used in the distortion compensating unit, there is a "predistortion (hereinafter, often referred to as the "PD") system." The distortion compensating unit of the PD system enhances the linearity of the output of the amplifying unit and suppresses the distortion of the output of the amplifying unit by multiplying a transmission baseband signal before input to the amplifying unit by a distortion compensation coefficient having the inverse characteristic of the non-linear distortion of the amplifying unit in advance. The signal resulting from the multiplication of the transmission baseband signal by the distortion compensation coefficient is often referred to as the "PD signal." Thus, the PD signal is a signal that gets distorted in advance before input to the amplifying unit in accordance with the inverse characteristic of the non-linear distortion of the amplifying unit.

For example, as the distortion compensating unit of the PD system, there is one that includes a lookup table (LUT) in which plural distortion compensation coefficients are stored and specifies, to the LUT, an address according to the power of the transmission baseband signal to read out the distortion compensation coefficient from the LUT. The distortion compensation coefficients stored in the LUT are sequentially updated so that the error between the transmission baseband signal as a reference signal and a signal that is output from the amplifying unit and is fed back (hereinafter, often referred to as the "feedback signal"), obtained by comparing both signals, may be minimized. As a related-art document, there is Japanese Laid-open Patent Publication No. 2007-96775.

SUMMARY

According to an aspect of the embodiments, a wireless communication system includes a baseband processing device configured to transmit a data signal via an optical transmission line, and a wireless device configured to receive the data signal via the optical transmission line and carry out wireless transmission of an output signal obtained by amplifying the data signal, wherein the wireless device includes a radio frequency circuit configured to amplify the data signal to generate the output signal, a first memory, and a first processor coupled to the first memory and configured to generate a feedback signal according to the output signal generated by the radio frequency circuit, and transmit the feedback signal to the baseband processing device via the optical transmission line, and wherein the baseband processing device includes a second memory, and a second processor coupled to the second memory and configured to acquire the feedback signal from the wireless device, and execute first processing of multiplying the data signal by a distortion compensation coefficient corresponding to an inverse characteristic of distortion in the radio frequency circuit based on the feedback signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Various contrivances are being made in order to increase the transmission capacity in a communication system (hereinafter, the transmission capacity will be often referred to as the "system capacity"). For example, in the 3rd generation partnership project long term evolution (3GPP LTE), discussion relating to techniques for increasing the system capacity by utilizing "small cells" besides "macrocells" is being made. Here, the "cell" is prescribed on the basis of the "cover area" and the "channel frequency" of one base station device (hereinafter, often referred to simply as the "base station"). The "cover area" may be the whole of the area to which radio waves transmitted from the base station reach or may be a divided area (so-called sector) obtained by dividing the reach area. The "channel frequency" is one unit of the frequency used by the base station for communications and is prescribed on the basis of the center frequency and the bandwidth. Furthermore, the channel frequency is part of the "operating band" allocated to the whole system. The "macrocell" is the cell of a base station capable of transmission with high transmission power, i.e. a base station having a large cover area. The "small cell" is the cell of a base station that carries out transmission with low transmission power, i.e. a base station having a small cover area.

To realize the shift to the small cells, a large number of small-cell base stations are to be disposed. Accordingly, studies are being made on a system in which the base station is divided into a baseband unit (BBU) and a remote radio head (RRH) and plural wireless devices are subordinated to one baseband processing device. Furthermore, it is desired to reduce the size of the wireless device in order to improve the flexibility in the placement of the base station.

The disclosed techniques are made in view of the above and intend to provide a baseband processing device, a wireless device, and a wireless communication system that allow size reduction of the wireless device.

Embodiments of a baseband processing device, a wireless device, and a wireless communication system disclosed by the present application will be described in detail below on the basis of the drawings. The baseband processing device, the wireless device, and the wireless communication system disclosed by the present application are not limited by the embodiments. Furthermore, a configuration having the same function in the embodiments is given the same symbol and overlapping description is omitted.

[First Embodiment]
[Outline of Wireless Communication System]

Figure 1:
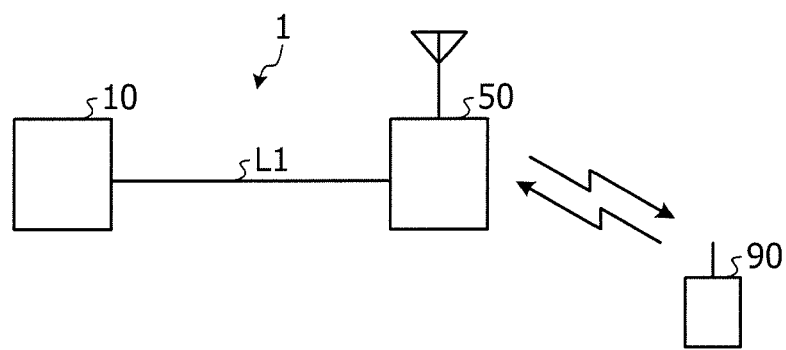
FIG. 1 is a block diagram illustrating one example of a wireless communication system of a first embodiment.

FIG. 1 is a block diagram illustrating one example of a wireless communication system of a first embodiment. In FIG. 1, a wireless communication system 1 includes a baseband processing device 10, a wireless device 50, and a terminal 90. The baseband processing device 10 and the wireless device 50 are coupled to each other by an optical transmission line L1. The baseband processing device 10 and the wireless device 50 are included in a base station. The wireless device 50 and the terminal 90 are wirelessly coupled to each other. Although the numbers of baseband processing devices 10, wireless devices 50, and terminals 90 are each set to one in FIG. 1, the numbers of them are not limited thereto.

The wireless device 50 receives a transmission-object data signal that is transmitted by the baseband processing device 10 and is to be delivered to the terminal 90 via the optical transmission line L1. The wireless device 50 amplifies the received data signal by an amplifying unit to be described later and then carries out wireless transmission of the resulting data signal to the terminal 90.

Furthermore, the wireless device 50 forms a "feedback signal" according to an output signal of the amplifying unit and transmits the formed feedback signal to the baseband processing device 10 via the optical transmission line L1.

The baseband processing device 10 acquires the feedback signal transmitted from the wireless device 50 and executes "distortion compensation processing" on the basis of the acquired feedback signal. The "distortion compensation processing" is processing of multiplying a transmission-object data signal by a distortion compensation coefficient corresponding to the inverse characteristic of distortion in the amplifying unit.

As described above, a distortion compensating unit that compensates for the distortion in the amplifying unit of the wireless device 50 is provided not in the wireless device 50 but in the baseband processing device 10. This can realize size reduction and power saving of the wireless device 50.

[Configuration Example of Baseband Processing Device]

Figure 2:
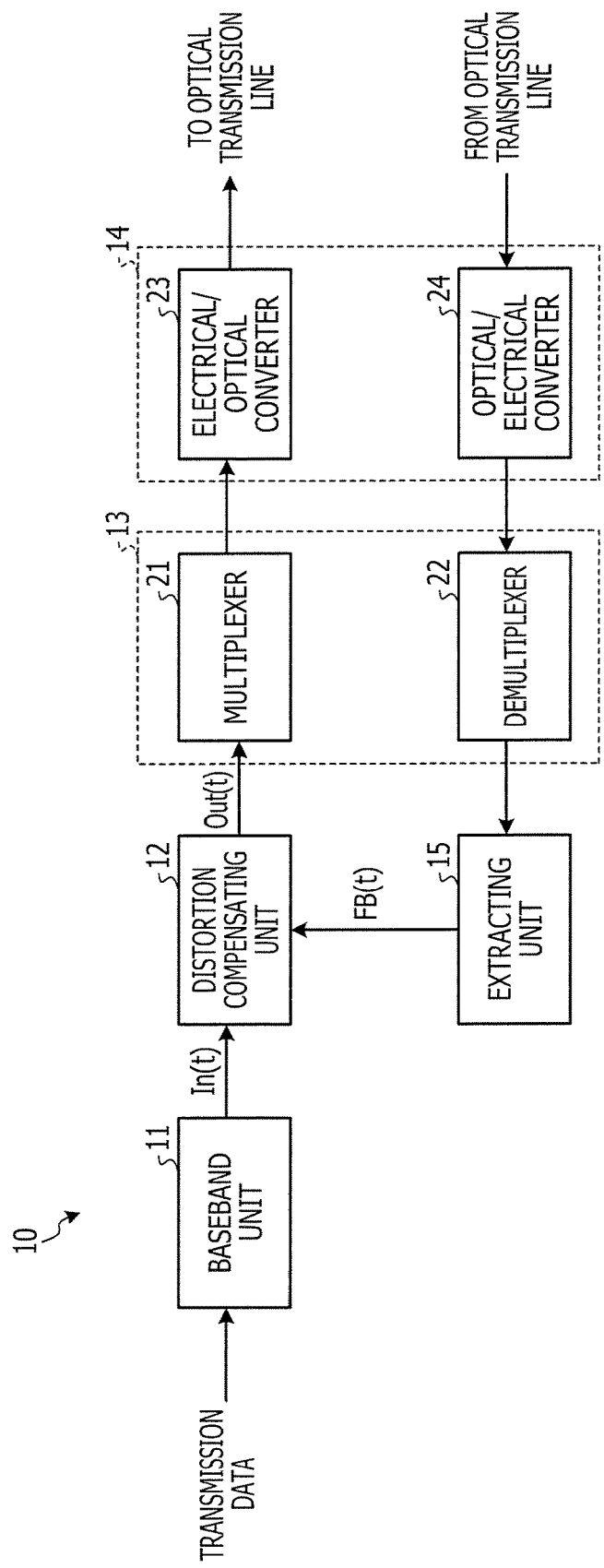
FIG. 2 is a block diagram illustrating one example of a baseband processing device of the first embodiment.

FIG. 2 is a block diagram illustrating one example of a baseband processing device of the first embodiment. The baseband processing device in FIG. 2 may be the baseband processing device 10 illustrated in FIG. 1. In FIG. 2, the baseband processing device 10 includes a baseband unit 11, a distortion compensating unit 12, a high-speed serial interface unit 13, an optical interface unit 14, and an extracting unit 15. The high-speed serial interface unit 13 includes a multiplexer 21 and a demultiplexer 22. The optical interface unit 14 includes an electrical/optical converter 23 and an optical/electrical converter 24.

The baseband unit 11 generates a transmission baseband signal by executing baseband processing such as coding processing and modulation processing for input transmission data, and outputs the generated transmission baseband signal In(t) to the distortion compensating unit 12.

The distortion compensating unit 12 is a distortion compensating unit of the PD system and includes a LUT in which plural distortion compensation coefficients each corresponding to a respective one of plural addresses corresponding to plural power ranges are stored. The distortion compensating unit 12 generates a PD signal Out(t) by multiplying the transmission baseband signal by the distortion compensation coefficient read out from the LUT through reference to the LUT in accordance with an address generated according to the power of the transmission baseband signal. The distortion compensating unit 12 outputs the generated PD signal Out(t) to the high-speed serial interface unit 13. Furthermore, the distortion compensating unit 12 updates the distortion compensation coefficients stored in the LUT on the basis of the error between the transmission baseband signal In(t) as a reference signal and a feedback signal FB(t).

Figure 3:
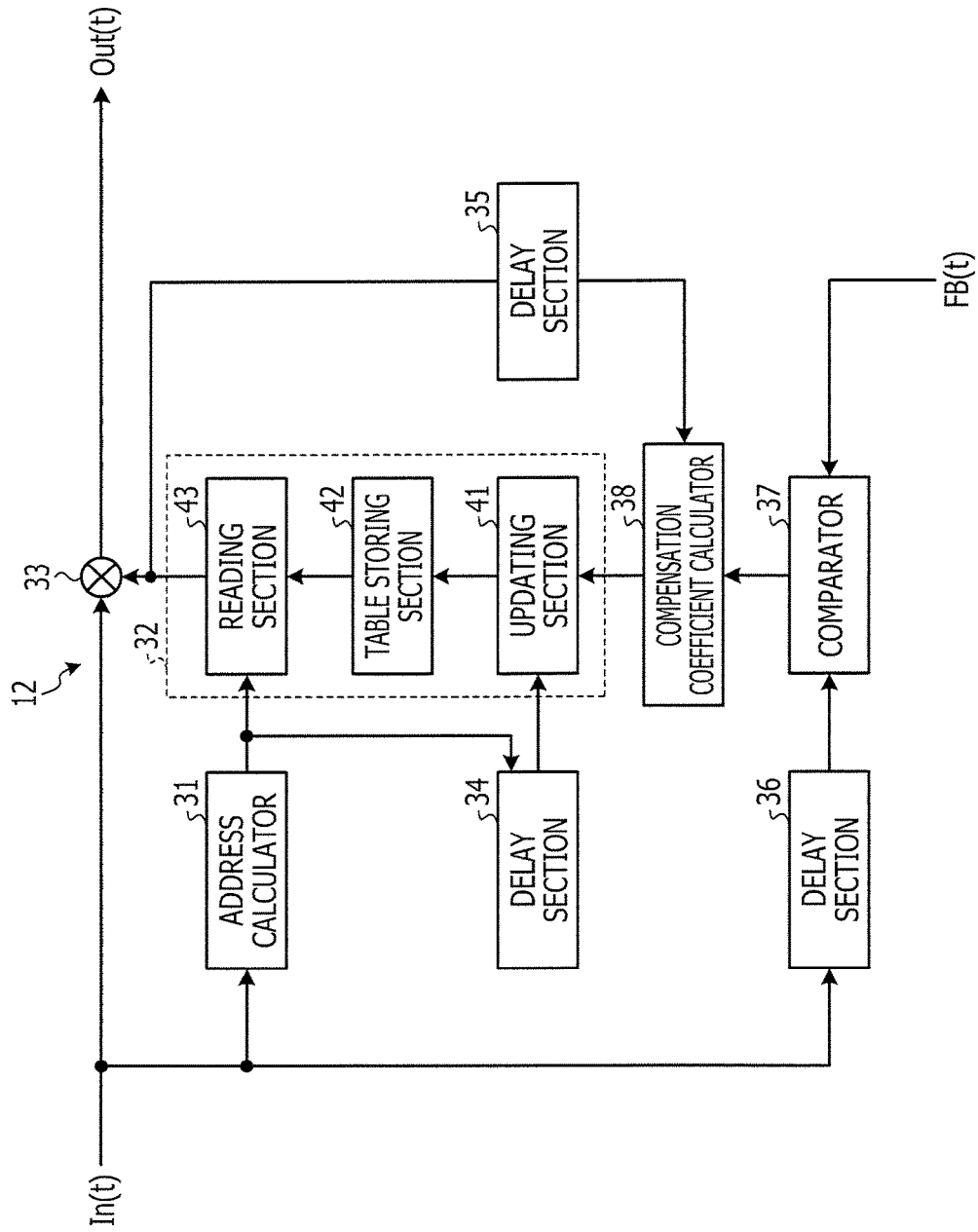
FIG. 3 is a block diagram illustrating one example of a distortion compensating unit of the first embodiment.

FIG. 3 is a block diagram illustrating one example of a distortion compensating unit of the first embodiment. The distortion compensating unit in FIG. 3 may be the distortion compensating unit 12 illustrated in FIG. 2. In FIG. 3, the distortion compensating unit 12 includes an address calculator 31, a LUT 32, a multiplier 33, delay sections 34, 35, and 36, a comparator 37, and a compensation coefficient calculator 38.

The address calculator 31 calculates an address on the basis of the power value and phase of the transmission baseband signal In(t).

The LUT 32 reads out the distortion compensation coefficient corresponding to an address Adr(t) calculated in the address calculator 31 from a distortion compensation coefficient table and outputs the read distortion compensation coefficient to the multiplier 33 and the delay section 35. Furthermore, the LUT 32 updates the distortion compensation coefficient table by using an update value of the distortion compensation coefficient calculated in the compensation coefficient calculator 38 and an update address received from the delay section 34.

For example, the LUT 32 includes an updating section 41, a table storing section 42, and a reading section 43 as illustrated in FIG. 3.

The updating section 41 executes update processing of updating the distortion compensation coefficient table by using the update value of the distortion compensation coefficient calculated in the compensation coefficient calculator 38 and the update address received from the delay section 34.

The table storing section 42 stores the "distortion compensation coefficient table" in which plural distortion compensation coefficients each corresponding to a respective one of plural address values are stored.

The reading section 43 reads out the distortion compensation coefficient corresponding to the address Adr(t) calculated in the address calculator 31 from the distortion compensation coefficient table and outputs the read distortion compensation coefficient to the multiplier 33 and the delay section 35.

The multiplier 33 multiplies the transmission baseband signal In(t) and the distortion compensation coefficient from the LUT 32 and outputs the transmission baseband signal In(t) resulting from the distortion compensation processing, i.e. the PD signal Out(t), to the high-speed serial interface unit 13.

The delay section 34 delays the address Adr(t) by the amount d1 of delay and outputs the delayed address Adr(t) to the updating section 41 as the update address. The amount d1 of delay corresponds to the total delay time taken until the transmission baseband signal In(t) is transmitted to the wireless device 50 and the update value of the distortion compensation coefficient is calculated on the basis of the feedback signal FB(t) transmitted from the wireless device 50 in response to the transmission baseband signal In(t).

The delay section 35 delays the distortion compensation coefficient output from the LUT 32 by the amount d2 of delay and outputs the delayed distortion compensation coefficient to the compensation coefficient calculator 38. The amount d2 of delay corresponds to the total delay time taken until the transmission baseband signal In(t) is transmitted to the wireless device 50 and the difference between the feedback signal FB(t) transmitted from the wireless device 50 in response to the transmission baseband signal In(t) and the transmission baseband signal In(t) is calculated.

The delay section 36 delays the transmission baseband signal In(t) as the reference signal by the amount d3 of delay and outputs the delayed reference signal to the comparator 37. The amount d3 of delay corresponds to the total delay time taken until the transmission baseband signal In(t) is transmitted to the wireless device 50 and the feedback signal FB(t) transmitted from the wireless device 50 in response to the transmission baseband signal In(t) is input to the comparator 37.

The comparator 37 compares the transmission baseband signal In(t) as the reference signal with the feedback signal FB(t) to calculate an error signal e(t) of both signals and output the calculated error signal e(t) to the compensation coefficient calculator 38.

The compensation coefficient calculator 38 calculates the update value of the distortion compensation coefficient on the basis of the error signal e(t) received from the comparator 37 and the distortion compensation coefficient received via the delay section 35, and outputs the calculated update value of the distortion compensation coefficient to the updating section 41.

Referring back to FIG. 2, the high-speed serial interface unit 13 is compliant with the JEDEC standards (JESD), which is a serial interface standard, for example. The high-speed serial interface unit 13 multiplexes (superimposes) a clock (i.e. timing information) on the transmission baseband signal In(t) resulting from the distortion compensation processing and outputs the multiple signal to the optical interface unit 14. Furthermore, the high-speed serial interface unit 13 demultiplexes a multiple signal received from the optical interface unit 14 into a clock and a signal other than the clock. As illustrated in FIG. 2, the high-speed serial interface unit 13 includes the multiplexer 21 and the demultiplexer 22. The above-described multiplexing processing is executed in the multiplexer 21 and the above-described demultiplexing processing is executed in the demultiplexer 22.

The optical interface unit 14 includes the electrical/optical converter 23 and the optical/electrical converter 24. The electrical/optical converter 23 converts the multiple signal received from the high-speed serial interface unit 13 from an electrical signal to an optical signal and sends out the obtained optical signal to the optical transmission line L1. The sent optical signal is transmitted to the wireless device 50. The optical/electrical converter 24 receives an optical signal transmitted from the wireless device 50 and converts the received optical signal to an electrical signal to output the obtained electrical signal, i.e. a received electrical signal, to the demultiplexer 22.

The extracting unit 15 extracts the feedback signal FB(t) from the signal other than the clock, obtained in the demultiplexer 22, and outputs the extracted feedback signal FB(t) to the distortion compensating unit 12.

[Configuration Example of Wireless Device]

Figure 4:
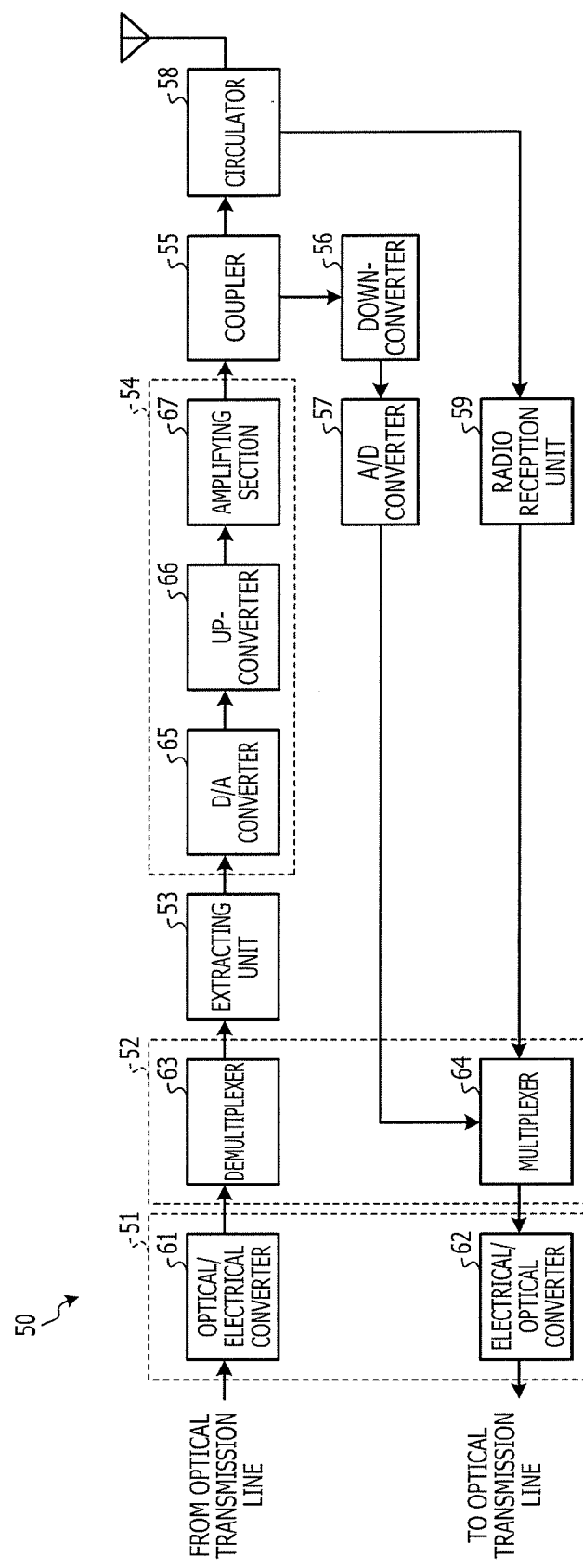
FIG. 4 is a block diagram illustrating one example of a wireless device of the first embodiment.

FIG. 4 is a block diagram illustrating one example of a wireless device of the first embodiment. The wireless device in FIG. 4 may be the wireless device 50 illustrated in FIG. 1. In FIG. 4, the wireless device 50 includes an optical interface unit 51, a high-speed serial interface unit 52, an extracting unit 53, a wireless transmission unit 54, a coupler 55, a down-converter 56, an analog-digital (A/D) converter 57, a circulator 58, and a wireless reception unit 59.

The optical interface unit 51 includes an optical/electrical converter 61 and an electrical/optical converter 62. The optical/electrical converter 61 receives an optical signal transmitted from the baseband processing device 10 and converts the received optical signal to an electrical signal to output the obtained electrical signal (i.e. received electrical signal) to the high-speed serial interface unit 52. The electrical/optical converter 62 converts a multiple signal received from the high-speed serial interface unit 52 from an electrical signal to an optical signal and sends out the obtained optical signal to the optical transmission line L1. The sent optical signal is transmitted to the baseband processing device 10.

The high-speed serial interface unit 52 is compliant with the JESD standard, which is a serial interface standard, for example. The high-speed serial interface unit 52 demultiplexes the received electrical signal received from the optical/electrical converter 61 into a clock and a signal other than the clock. The high-speed serial interface unit 52 multiplexes (superimposes) a clock, i.e. timing information, on a feedback signal received from the A/D converter 57 and a received signal received from the wireless reception unit 59 and outputs the multiple signal to the optical interface unit 51. As illustrated in FIG. 4, the high-speed serial interface unit 52 includes a demultiplexer 63 and a multiplexer 64. The above-described multiplexing processing is executed in the multiplexer 64 and the above-described demultiplexing processing is executed in the demultiplexer 63.

The extracting unit 53 extracts a data signal from the signal other than the clock, obtained in the demultiplexer 63, and outputs the extracted data signal to the wireless transmission unit 54.

The wireless transmission unit 54 executes given wireless processing, for example, digital-analog conversion, up-conversion, amplification, and so forth, on the data signal extracted in the extracting unit 53 and outputs the obtained wireless signal to the coupler 55. The wireless transmission unit 54 includes a digital-analog (D/A) converter 65, an up-converter 66, and an amplifying section 67 as illustrated in FIG. 4. The above-described digital-analog conversion processing is executed in the D/A converter 65. The above-described up-conversion processing is executed in the up-converter 66. The above-described amplification processing is executed in the amplifying section 67.

The coupler 55 distributes the wireless signal output from the wireless transmission unit 54 to the circulator 58 and the down-converter 56. Thereby, the output signal of the amplifying section 67 is fed back to the baseband processing device 10 via the down-converter 56 and the A/D converter 57.

The down-converter 56 carries out down-conversion of the signal input from the coupler 55 and outputs the down-converted signal to the A/D converter 57.

The A/D converter 57 converts the down-converted signal from an analog signal to a digital signal and outputs the digital signal resulting from the conversion to the multiplexer 64 as the feedback signal FB(t).

The circulator 58 transmits the wireless signal output from the coupler 55 via an antenna. Furthermore, the circulator 58 outputs a signal received via the antenna to the wireless reception unit 59.

The wireless reception unit 59 executes given wireless reception processing, for example, down-conversion, analog-digital conversion, and so forth, on the wireless signal received from the circulator 58 and outputs the obtained received signal to the multiplexer 64.

As described above, according to the present embodiment, the baseband processing device 10 includes the distortion compensating unit 12 that compensates for distortion in the amplifying section 67 of the wireless device 50.

This configuration of the baseband processing device 10 can remove the distortion compensating unit from the wireless device 50 and thus realize size reduction of the wireless device 50.

Furthermore, in the wireless device 50, the down-converter 56 and the A/D converter 57 as a forming unit of the feedback signal form a feedback signal according to the output signal of the amplifying section 67, and the high-speed serial interface unit 52 and the optical interface unit 51 as a transmitting unit transmit the feedback signal to the baseband processing device 10 via the optical transmission line L1.

This configuration of the wireless device 50 allows the distortion compensation processing to be executed in the baseband processing device 10. As a result, size reduction of the wireless device 50 can be realized.

[Second Embodiment]

A second embodiment relates to frame synchronization processing between a baseband processing device and a wireless device.

[Configuration Example of Baseband Processing Device]

Figure 5:
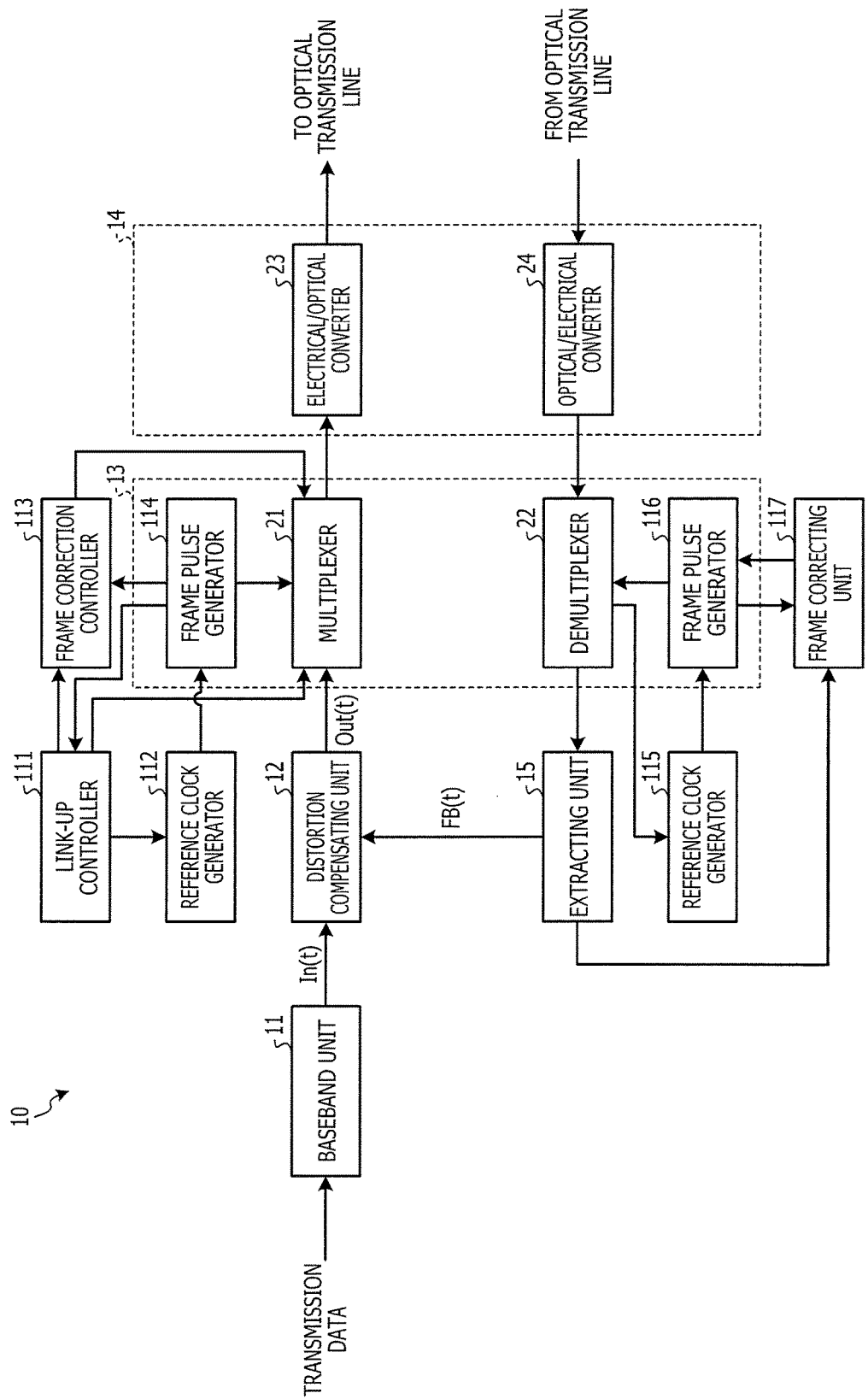
FIG. 5 is a block diagram illustrating one example of a baseband processing device of a second embodiment.

FIG. 5 is a block diagram illustrating one example of a baseband processing device of the second embodiment. In FIG. 5, a configuration relating to the frame synchronization processing is illustrated in addition to the configuration of the baseband processing device 10 illustrated in FIG. 2.

In FIG. 5, the baseband processing device 10 includes a link-up controller 111, reference clock generators 112 and 115, a frame correction controller 113, frame pulse generators 114 and 116, and a frame correcting unit 117. Here, the reference clock generators 112 and 115 are described as different functional units. However, the reference clock generators 112 and 115 are not limited thereto and may be implemented by one functional unit. Similarly, the frame pulse generators 114 and 116 may also be implemented by one functional unit.

The link-up controller 111 controls link-up of the down-link line, i.e. the line of the direction from the baseband processing device 10 to a wireless device 50. For example, the link-up controller 111 outputs a K code to the multiplexer 21 in a link-up procedure. A clock is multiplexed on this K code and the resulting K code is transmitted to the wireless device 50.

Furthermore, the link-up controller 111 outputs an output command of a "start trigger pulse" to the reference clock generator 112 after the elapse of a given time from the start of the link-up procedure. By this output command, the "start trigger pulse" is output from the reference clock generator 112 to the frame pulse generator 114, and the frame pulse generator 114 outputs a frame pulse to the multiplexer 21 every frame. The "start trigger pulse" is e.g. a one-pulse signal.

Moreover, when the output of the frame pulse is started, the link-up controller 111 receives a "link-up request signal" from the frame pulse generator 114 and outputs an initial lane alignment sequence (ILAS) pattern to the multiplexer 21 in response to this "link-up request signal." A clock is multiplexed on this ILAS pattern and the resulting ILAS pattern is transmitted to the wireless device 50.

In addition, after outputting the ILAS pattern, the link-up controller 111 outputs a "correction control start command" to the frame correction controller 113. This causes the frame correction controller 113 to output a count value of the frame pulse generator 114 to the multiplexer 21. This count value is transmitted to the wireless device 50.

When receiving the output command of the "start trigger pulse" from the link-up controller 111, the reference clock generator 112 outputs the "start trigger pulse" to the frame pulse generator 114.

When receiving the "start trigger pulse" from the reference clock generator 112, the frame pulse generator 114 starts the output of the frame pulse. For example, the frame pulse generator 114 includes a counter and outputs the frame pulse to the multiplexer 21 every time the count value of the counter becomes the value corresponding to one frame. Furthermore, when starting the output of the frame pulse, the frame pulse generator 114 outputs the above-described "link-up request signal" to the link-up controller 111.

When receiving the "correction control start command" from the link-up controller 111, the frame correction controller 113 acquires the count value at the timing from the frame pulse generator 114 and outputs a control data signal including the acquired count value to the multiplexer 21. This control data signal is transmitted to the wireless device 50.

When receiving a clock obtained by being demultiplexed from a multiple signal in the demultiplexer 22, the reference clock generator 115 outputs a "start trigger pulse" to the frame pulse generator 116.

When receiving the "start trigger pulse" from the reference clock generator 115, the frame pulse generator 116 starts output of a frame pulse. For example, the frame pulse generator 116 includes a counter and outputs the frame pulse to the demultiplexer 22 every time the count value of the counter becomes the value corresponding to one frame.

When receiving a control data signal that is transmitted from the wireless device 50 and is extracted in the extracting unit 15, the frame correcting unit 117 acquires the count value at the timing from the frame pulse generator 116. Then, the frame correcting unit 117 calculates a correction value to correct the count value of the frame pulse generator 116 on the basis of the count value of the wireless device 50 included in the control data signal. Then, the frame correcting unit 117 corrects the count value of the frame pulse generator 116 by the calculated correction value. For example, the frame correcting unit 117 calculates the correction value by subtracting the count value of the wireless device 50 included in the control data signal from the count value of the frame pulse generator 116.

[Configuration Example of Wireless Device]

Figure 6:
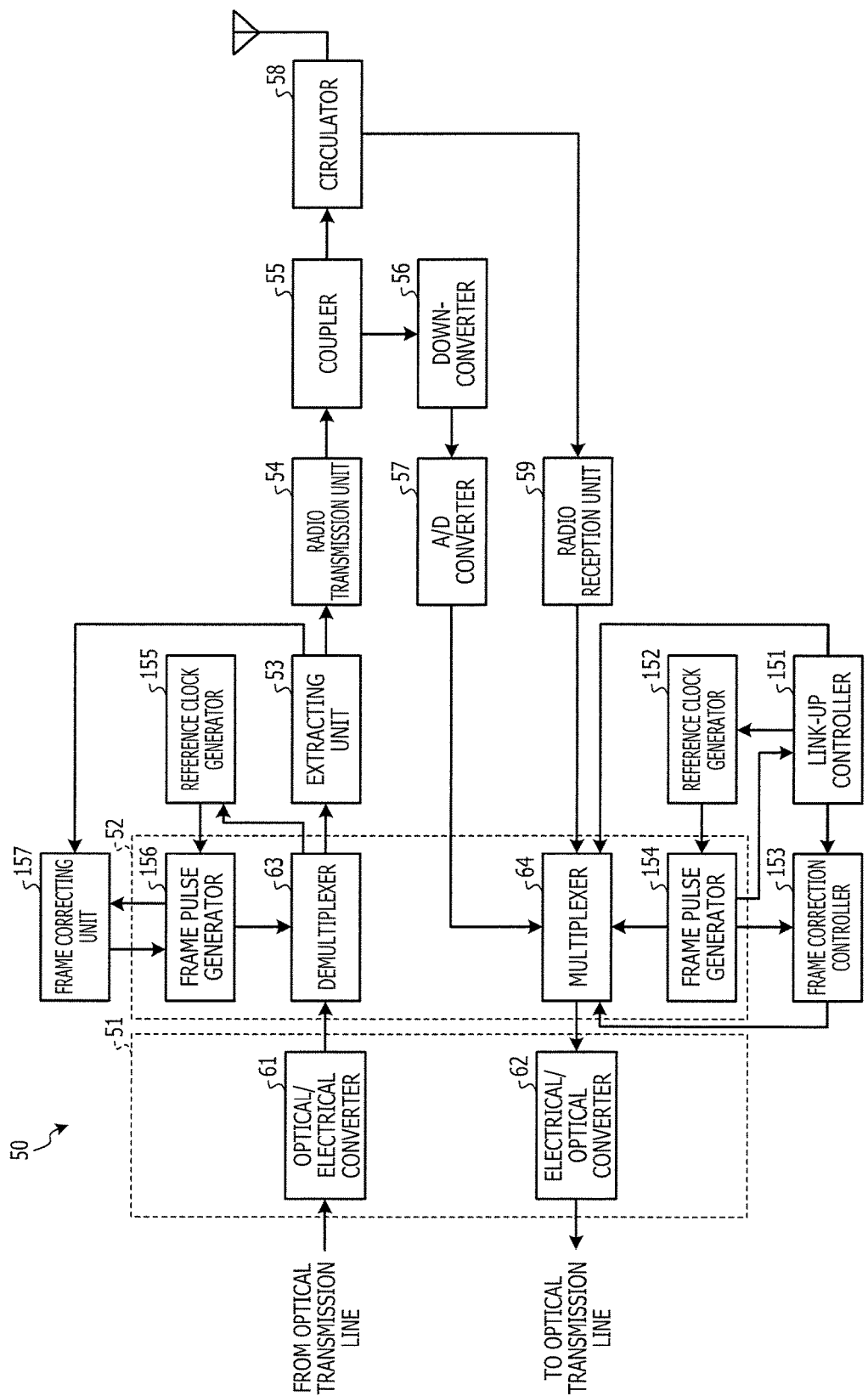
FIG. 6 is a block diagram illustrating one example of a wireless device of the second embodiment.

FIG. 6 is a block diagram illustrating one example of a wireless device of the second embodiment. In FIG. 6, a configuration relating to the frame synchronization processing is illustrated in addition to the configuration of the wireless device 50 illustrated in FIG. 4. Furthermore, the processing operation of functional units relating to the frame synchronization processing of the wireless device 50 of the second embodiment is basically the same as the processing operation of functional units relating to the frame synchronization processing of the above-described baseband processing device 10 of the second embodiment.

In FIG. 6, the wireless device 50 includes a link-up controller 151, reference clock generators 152 and 155, a frame correction controller 153, frame pulse generators 154 and 156, and a frame correcting unit 157. Here, the reference clock generators 152 and 155 are described as different functional units. However, the reference clock generators 152 and 155 are not limited thereto and may be implemented by one functional unit. Similarly, the frame pulse generators 154 and 156 may also be implemented by one functional unit.

The link-up controller 151 controls link-up of the uplink line, i.e. the line of the direction from the wireless device 50 to the baseband processing device 10. For example, the link-up controller 151 outputs a K code to the multiplexer 64 in a link-up procedure. A clock is multiplexed on this K code and the resulting K code is transmitted to the baseband processing device 10.

Furthermore, the link-up controller 151 outputs an output command of a "start trigger pulse" to the reference clock generator 152 after the elapse of a given time from the start of the link-up procedure. By this output command, the "start trigger pulse" is output from the reference clock generator 152 to the frame pulse generator 154, and the frame pulse generator 154 outputs a frame pulse to the multiplexer 64 every frame. The "start trigger pulse" is e.g. a one-pulse signal.

Moreover, when the output of the frame pulse is started, the link-up controller 151 receives a "link-up request signal" from the frame pulse generator 154 and outputs an ILAS pattern to the multiplexer 64 in response to this "link-up request signal." A clock is multiplexed on this ILAS pattern and the resulting ILAS pattern is transmitted to the baseband processing device 10.

In addition, after outputting the ILAS pattern, the link-up controller 151 outputs a "correction control start command" to the frame correction controller 153. This causes the frame correction controller 153 to output a count value of the frame pulse generator 154 to the multiplexer 64. This count value is transmitted to the baseband processing device 10.

When receiving the output command of the "start trigger pulse" from the link-up controller 151, the reference clock generator 152 outputs the "start trigger pulse" to the frame pulse generator 154.

When receiving the "start trigger pulse" from the reference clock generator 152, the frame pulse generator 154 starts the output of the frame pulse. For example, the frame pulse generator 154 includes a counter and outputs the frame pulse to the multiplexer 64 every time the count value of the counter becomes the value corresponding to one frame. Furthermore, when starting the output of the frame pulse, the frame pulse generator 154 outputs the above-described "link-up request signal" to the link-up controller 151.

When receiving the "correction control start command" from the link-up controller 151, the frame correction controller 153 acquires the count value at the timing from the frame pulse generator 154 and outputs a control data signal including the acquired count value to the multiplexer 64. This control data signal is transmitted to the baseband processing device 10.

When receiving a clock obtained by being demultiplexed from a multiple signal in the demultiplexer 63, the reference clock generator 155 outputs a "start trigger pulse" to the frame pulse generator 156.

When receiving the "start trigger pulse" from the reference clock generator 155, the frame pulse generator 156 starts output of a frame pulse. For example, the frame pulse generator 156 includes a counter and outputs the frame pulse to the demultiplexer 63 every time the count value of the counter becomes the value corresponding to one frame.

When receiving a control data signal that is transmitted from the baseband processing device 10 and is extracted in the extracting unit 53, the frame correcting unit 157 acquires the count value at the timing from the frame pulse generator 156. Then, the frame correcting unit 157 calculates a correction value to correct the count value of the frame pulse generator 156 on the basis of the count value of the baseband processing device 10 included in the control data signal. Then, the frame correcting unit 157 corrects the count value of the frame pulse generator 156 by the calculated correction value. For example, the frame correcting unit 157 calculates the correction value by subtracting the count value of the baseband processing device 10 included in the control data signal from the count value of the frame pulse generator 156.

[Operation Example of Wireless Communication System]

Figure 7:
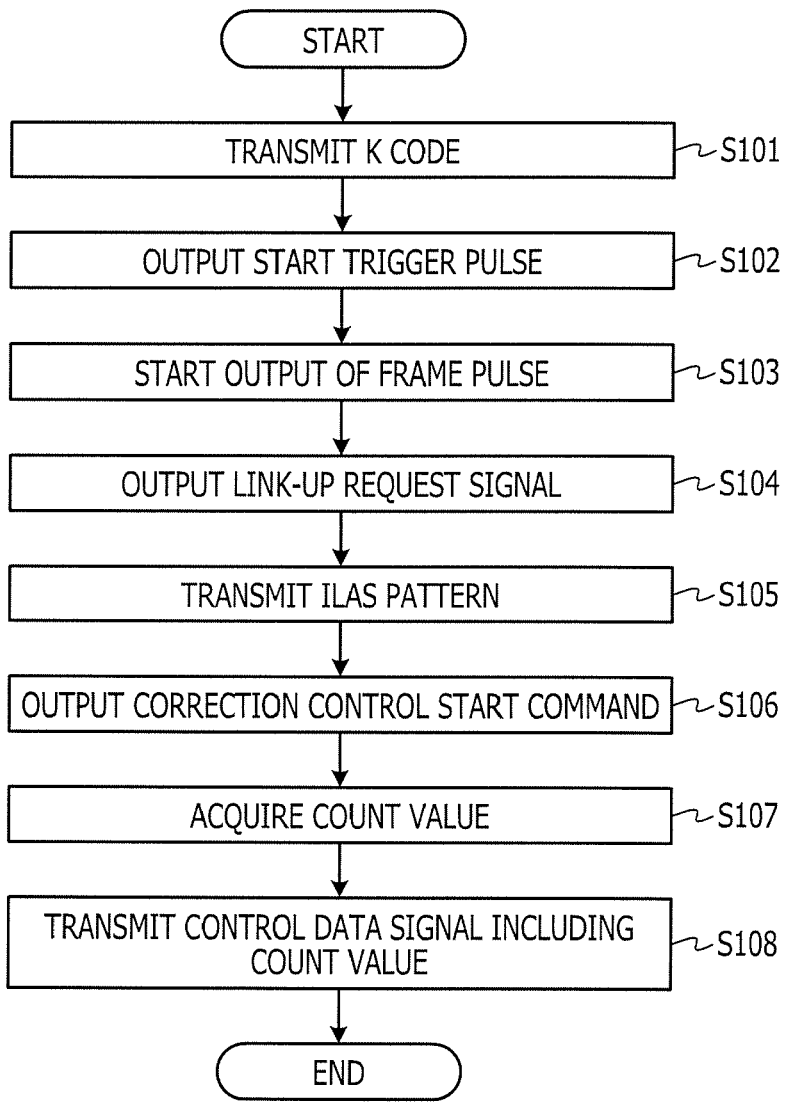
FIG. 7 is a flowchart illustrating one example of a processing operation of a baseband processing device of the second embodiment.

One example of a processing operation of a wireless communication system of the second embodiment including the above configuration will be described. Here, particularly a processing operation relating to frame synchronization processing of downlink will be described. FIG. 7 is a flowchart illustrating one example of a processing operation of a baseband processing device of the second embodiment. The baseband processing device performing the processing operation in FIG. 7 may be the baseband processing device 10 illustrated in FIG. 5.

In the baseband processing device 10, the link-up controller 111 outputs a K code to the multiplexer 21 (step S101).

The reference clock generator 112 outputs a "start trigger pulse" to the frame pulse generator 114 (step S102). Here, the reference clock generator 112 outputs the "start trigger pulse" when receiving an output command of the "start trigger pulse" from the link-up controller 111. The link-up controller 111 outputs the output command of the "start trigger pulse" to the reference clock generator 112 after the elapse of a given time from the start of a link-up procedure.

When receiving the "start trigger pulse" from the reference clock generator 112, the frame pulse generator 114 starts output of a frame pulse (step S103).

When starting the output of the frame pulse, the frame pulse generator 114 outputs a "link-up request signal" to the link-up controller 111 (step S104).

When receiving the "link-up request signal" from the frame pulse generator 114, the link-up controller 111 transmits an ILAS pattern to the wireless device 50 (step S105).

After outputting the ILAS pattern, the link-up controller 111 outputs a "correction control start command" to the frame correction controller 113 (step S106).

When receiving the "correction control start command" from the link-up controller 111, the frame correction controller 113 acquires a count value at the timing from the frame pulse generator 114 (step S107).

The frame correction controller 113 transmits a control data signal including the acquired count value to the wireless device 50 (step S108).

Figure 8:
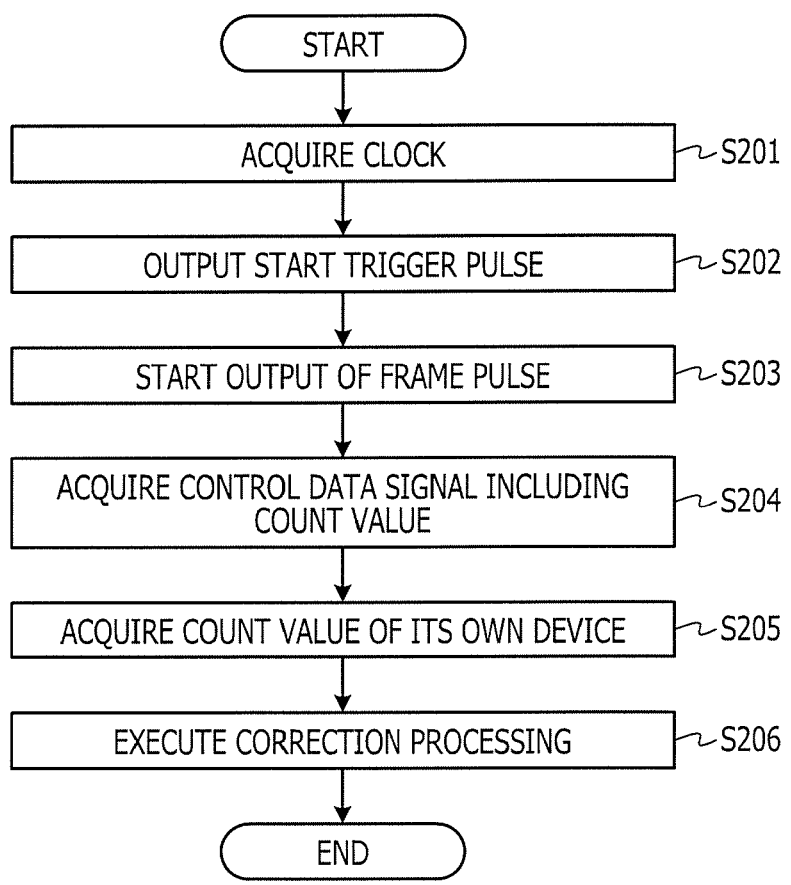
FIG. 8 is a flowchart illustrating one example of a processing operation of a wireless device of the second embodiment.

FIG. 8 is a flowchart illustrating one example of a processing operation of a wireless device of the second embodiment. The wireless device performing the processing operation in FIG. 8 may be the wireless device 50 illustrated in FIG. 6.

In the wireless device 50, the reference clock generator 155 acquires a clock obtained by being demultiplexed from a multiple signal in the demultiplexer 63 (step S201).

When receiving the clock obtained by being demultiplexed from the multiple signal in the demultiplexer 63, the reference clock generator 155 outputs a "start trigger pulse" to the frame pulse generator 156 (step S202).

When receiving the "start trigger pulse" from the reference clock generator 155, the frame pulse generator 156 starts output of a frame pulse (step S203).

The frame correcting unit 157 acquires a control data signal (including a count value) that is transmitted from the baseband processing device 10 and is extracted in the extracting unit 53 (step S204).

When receiving the control data signal, the frame correcting unit 157 acquires a count value at the timing from the frame pulse generator 156 (step S205).

The frame correcting unit 157 executes correction processing on the basis of the count value of the baseband processing device 10 included in the control data signal and the count value of the frame pulse generator 156 (step S206). That is, the frame correcting unit 157 calculates a correction value to correct the count value of the frame pulse generator 156 on the basis of the count value of the baseband processing device 10 included in the control data signal. Then, the frame correcting unit 157 corrects the count value of the frame pulse generator 156 by the calculated correction value.

As described above, according to the present embodiment, in the baseband processing device 10, the frame correcting unit 117 acquires the count value in the counter of the wireless device 50 and corrects the count value in the counter of the frame pulse generator 116 on the basis of the acquired count value.

This configuration of the baseband processing device 10 allows the frame timing of the uplink of the baseband processing device 10 to synchronize with the frame timing of the wireless device 50.

Furthermore, in the wireless device 50, the frame correction controller 153 acquires the count value from the frame pulse generator 154 and transmits the control data signal including the acquired count value to the baseband processing device 10 via the optical transmission line L1.

This configuration of the wireless device 50 allows the frame timing of the uplink of the baseband processing device 10 to synchronize with the frame timing of the wireless device 50.

Moreover, in the wireless device 50, the frame correcting unit 157 acquires the count value in the counter of the baseband processing device 10 and corrects the count value in the counter of the frame pulse generator 156 on the basis of the acquired count value.

This configuration of the wireless device 50 allows the frame timing of the downlink of the wireless device 50 to synchronize with the frame timing of the baseband processing device 10.

Furthermore, in the baseband processing device 10, the frame correction controller 113 acquires the count value at the timing from the frame pulse generator 114 and transmits the control data signal including the acquired count value to the wireless device 50 via the optical transmission line L1.

This configuration of the baseband processing device 10 allows the frame timing of the downlink of the wireless device 50 to synchronize with the frame timing of the baseband processing device 10.

[Third Embodiment]

A third embodiment relates to delay correction control in the distortion compensation processing.

[Configuration Example of Baseband Processing Device]

Figure 9:
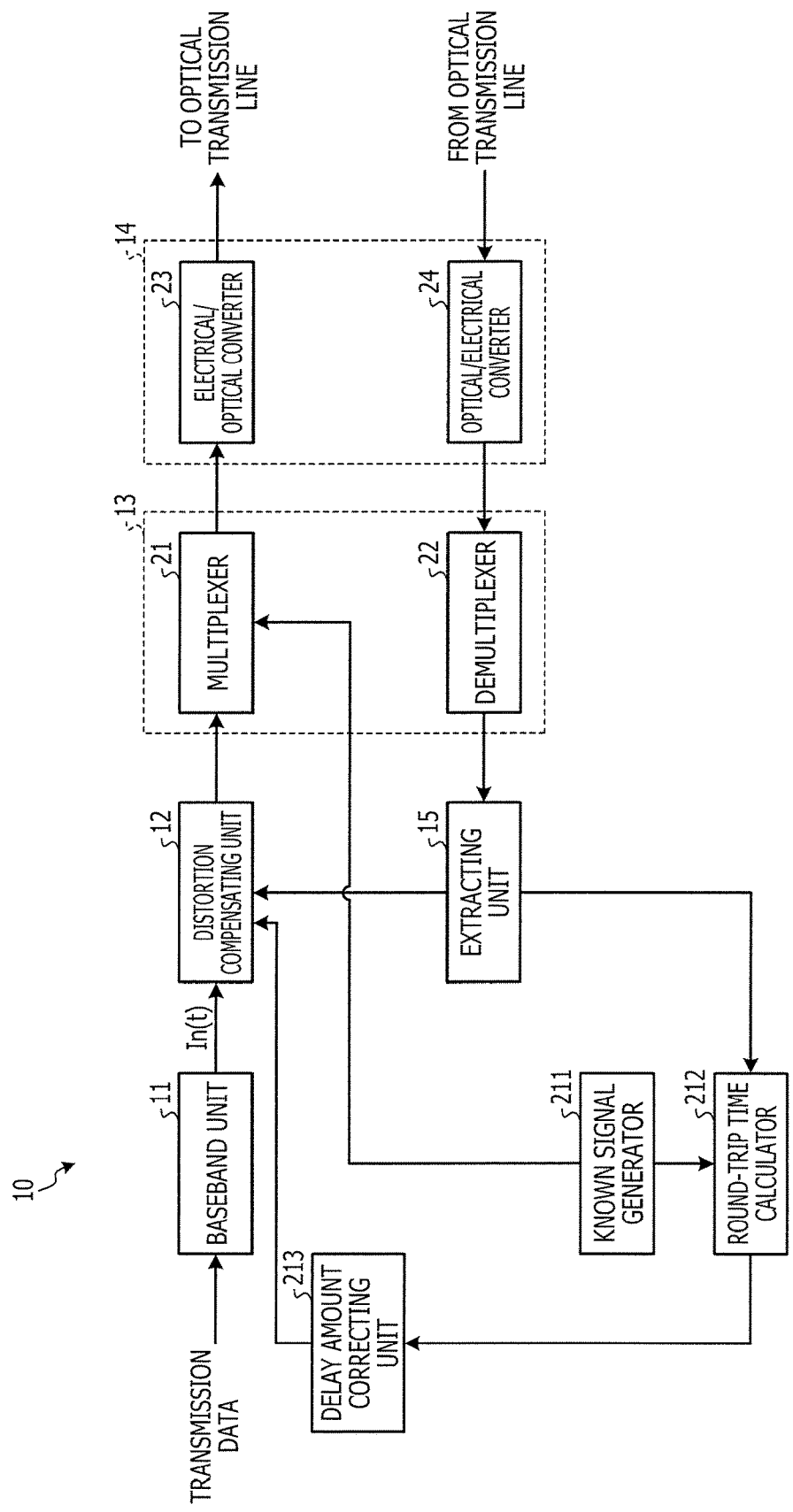
FIG. 9 is a block diagram illustrating one example of a baseband processing device of a third embodiment.

FIG. 9 is a block diagram illustrating one example of a baseband processing device of the third embodiment. In FIG. 9, a configuration relating to the delay correction control is illustrated in addition to the configuration of the baseband processing device 10 illustrated in FIG. 2.

In FIG. 9, the baseband processing device 10 includes a known signal generator 211, a round-trip time calculator 212, and a delay amount correcting unit 213.

The known signal generator 211 generates a known signal (hereinafter, often referred to as the "test data signal") used to measure round-trip time and outputs the generated known signal to the multiplexer 21. Furthermore, the known signal generator 211 outputs a "transmission timing notification signal" to notify the transmission timing to the round-trip time calculator 212 simultaneously with the output of the known signal to the multiplexer 21.

The round-trip time calculator 212 receives the "transmission timing notification signal" from the known signal generator 211 and acquires the timing notified by the signal (i.e. transmission timing). Then, when receiving a "return signal" that is transmitted from the wireless device 50 and is extracted in the extracting unit 15, the round-trip time calculator 212 acquires the timing of the signal reception (i.e. reception timing). Then, the round-trip time calculator 212 calculates the round-trip time on the basis of the transmission timing and the reception timing. The round-trip time calculator 212 may start measurement of elapsed time upon receiving the "transmission timing notification signal" from the known signal generator 211 and end the measurement of the elapsed time upon receiving the "return signal," and may employ the measured elapsed time as the round-trip time.

The delay amount correcting unit 213 corrects a "set delay amounts" in the delay sections 34, 35, and 36 of the distortion compensating unit 12 on the basis of the round-trip time acquired in the round-trip time calculator 212. For example, the delay amount correcting unit 213 holds a "correspondence table" in a memory (not illustrated) and identifies the set delay amounts resulting from the correction on the basis of the round-trip time acquired in the round-trip time calculator 212 and the "correspondence table." The "correspondence table" holds plural candidate values of the round-trip time and delay amounts according to the respective candidate values in association with each other.

[Configuration Example of Wireless Device]

Figure 10:
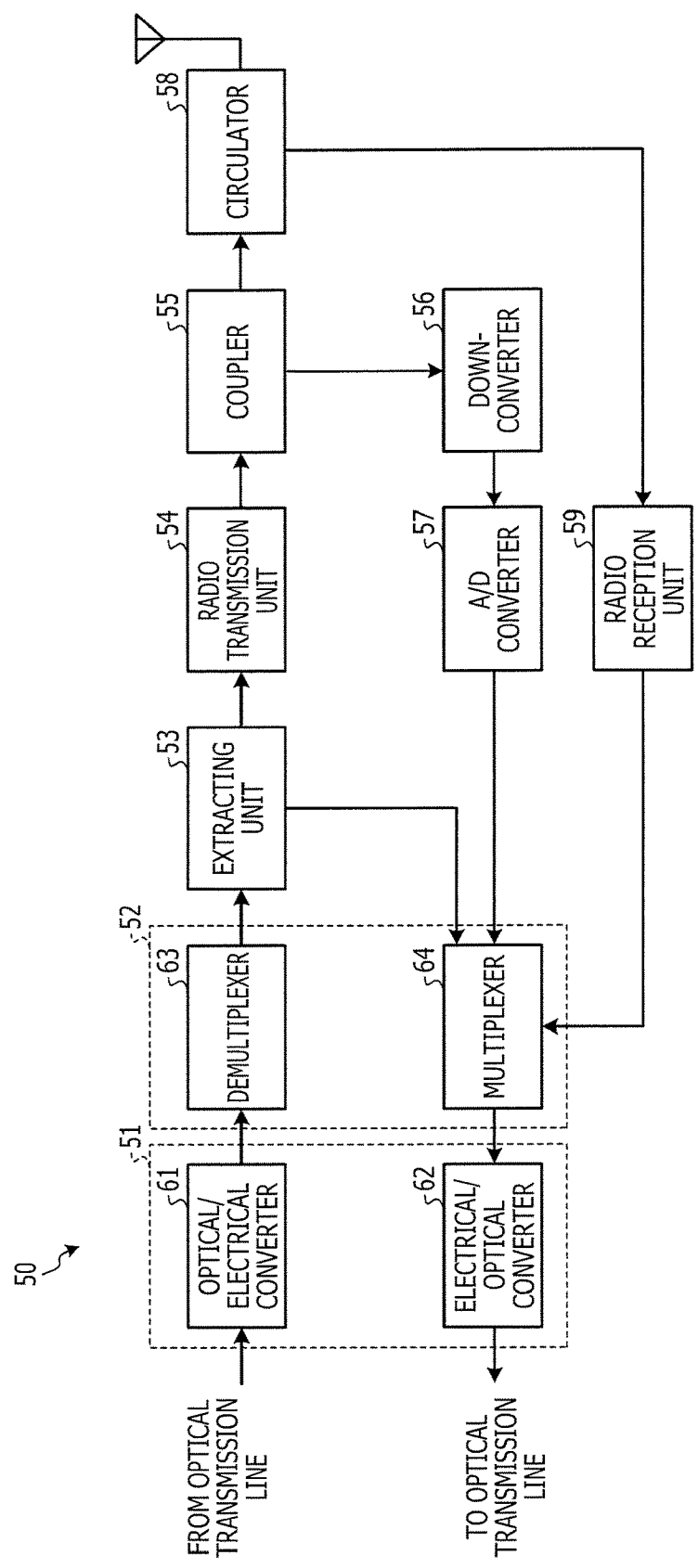
FIG. 10 is a block diagram illustrating one example of a wireless device of the third embodiment.

FIG. 10 is a block diagram illustrating one example of a wireless device of the third embodiment. The wireless device in FIG. 10 may be the wireless device 50 illustrated in FIG. 4.

In FIG. 10, the extracting unit 53 of the wireless device 50 extracts a "test data signal" from a signal other than a clock demultiplexed from a multiple signal in the demultiplexer 63, and outputs the extracted "test data signal" to the multiplexer 64 as a "return signal." This "return signal" is transmitted to the baseband processing device 10.

[Operation Example of Wireless Communication System]

Figure 11:
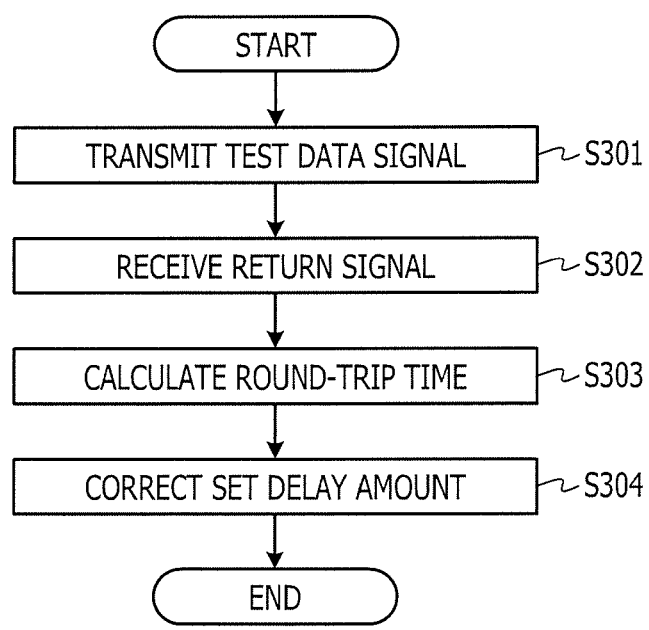
FIG. 11 is a flowchart illustrating one example of a processing operation of a baseband processing device of the third embodiment.

One example of a processing operation of a wireless communication system of the third embodiment including the above configuration will be described. Here, particularly a processing operation of a baseband processing device will be described. FIG. 11 is a flowchart illustrating one example of a processing operation of a baseband processing device of the third embodiment. The baseband processing device performing the processing operation in FIG. 11 may be the baseband processing device 10 illustrated in FIG. 5.

The known signal generator 211 transmits a test data signal to the wireless device 50 by outputting the test data signal to the multiplexer 21 (step S301).

The round-trip time calculator 212 receives a return signal responding to the transmitted test data signal (step S302).

The round-trip time calculator 212 calculates round-trip time on the basis of the transmission timing and the reception timing (S303).

The delay amount correcting unit 213 corrects a "set delay amounts" in the delay sections 34, 35, and 36 of the distortion compensating unit 12 on the basis of the round-trip time acquired in the round-trip time calculator 212 (step S304).

As described above, according to the present embodiment, in the baseband processing device 10, the known signal generator 211 transmits the test data signal to the wireless device 50 via the optical transmission line L1. Then, the round-trip time calculator 212 calculates the round-trip time on the basis of the transmission timing of the test data signal and the reception timing of the return signal transmitted from the wireless device 50 in response to the test data signal. Then, the delay amount correcting unit 213 corrects the set delay amounts in the delay sections 34, 35, and 36 of the distortion compensating unit 12 on the basis of the calculated round-trip time.

Due to this configuration of the baseband processing device 10, the timing in the distortion compensation processing can be adjusted even when the length of the optical transmission line L1 is changed for example.

[Fourth Embodiment]

In a fourth embodiment, whether or not to execute the calculation processing and update processing of the distortion compensation coefficient is controlled depending on the status of the optical transmission line L1.

[Configuration Example of Baseband Processing Device]

Figure 12:
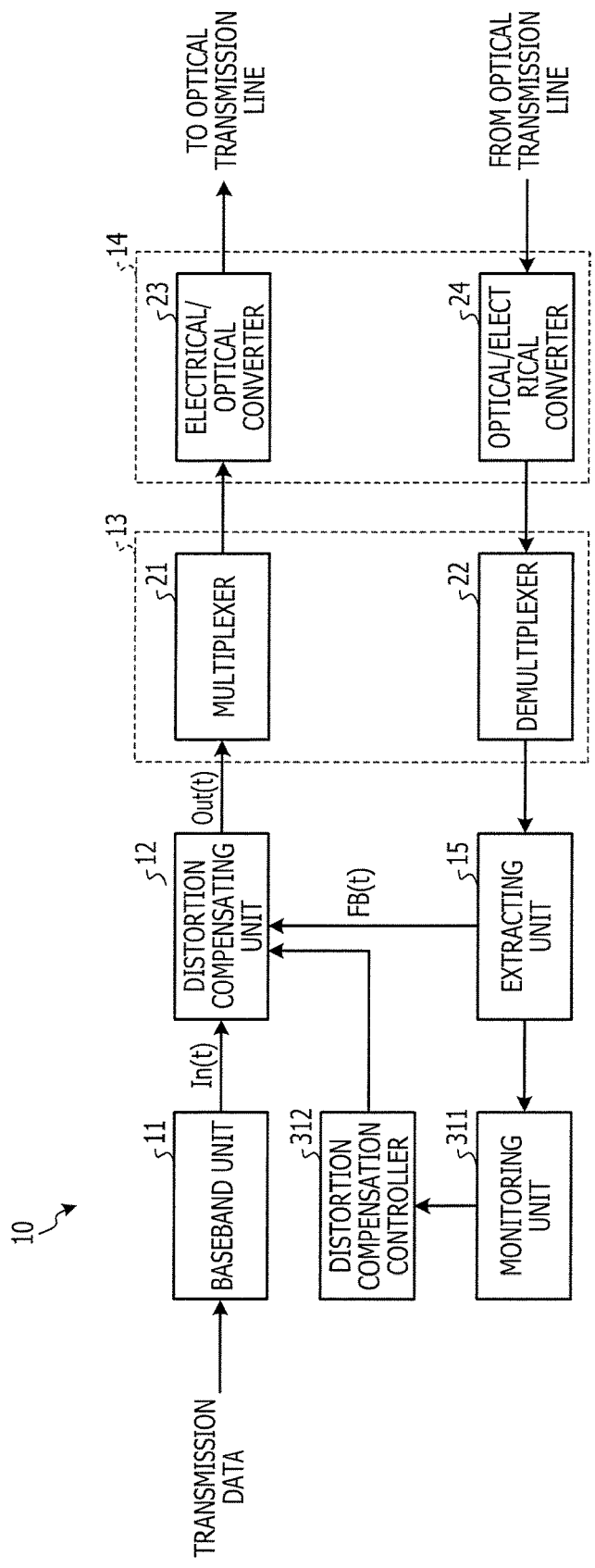
FIG. 12 is a block diagram illustrating one example of a baseband processing device of a fourth embodiment.

FIG. 12 is a block diagram illustrating one example of a baseband processing device of the fourth embodiment. In FIG. 12, a configuration relating to control of whether or not to execute the distortion compensation processing is illustrated in addition to the configuration of the baseband processing device 10 illustrated in FIG. 2.

In FIG. 12, the baseband processing device 10 includes a monitoring unit 311 and a distortion compensation controller 312.

The monitoring unit 311 determines whether or not an error is present in a known signal (hereinafter, often referred to as the "frame synchronization bit") that is transmitted from a wireless device 50 and is extracted in the extracting unit 15.

If it is determined in the monitoring unit 311 that an error is present, the distortion compensation controller 312 stops the calculation processing and update processing of the distortion compensation coefficient in the distortion compensating unit 12. On the other hand, if it is determined in the monitoring unit 311 that an error is absent in a status in which the calculation processing and update processing of the distortion compensation coefficient are stopped, the distortion compensation controller 312 starts the calculation processing and update processing of the distortion compensation coefficient by the distortion compensating unit 12.

[Configuration Example of Wireless Device]

Figure 13:
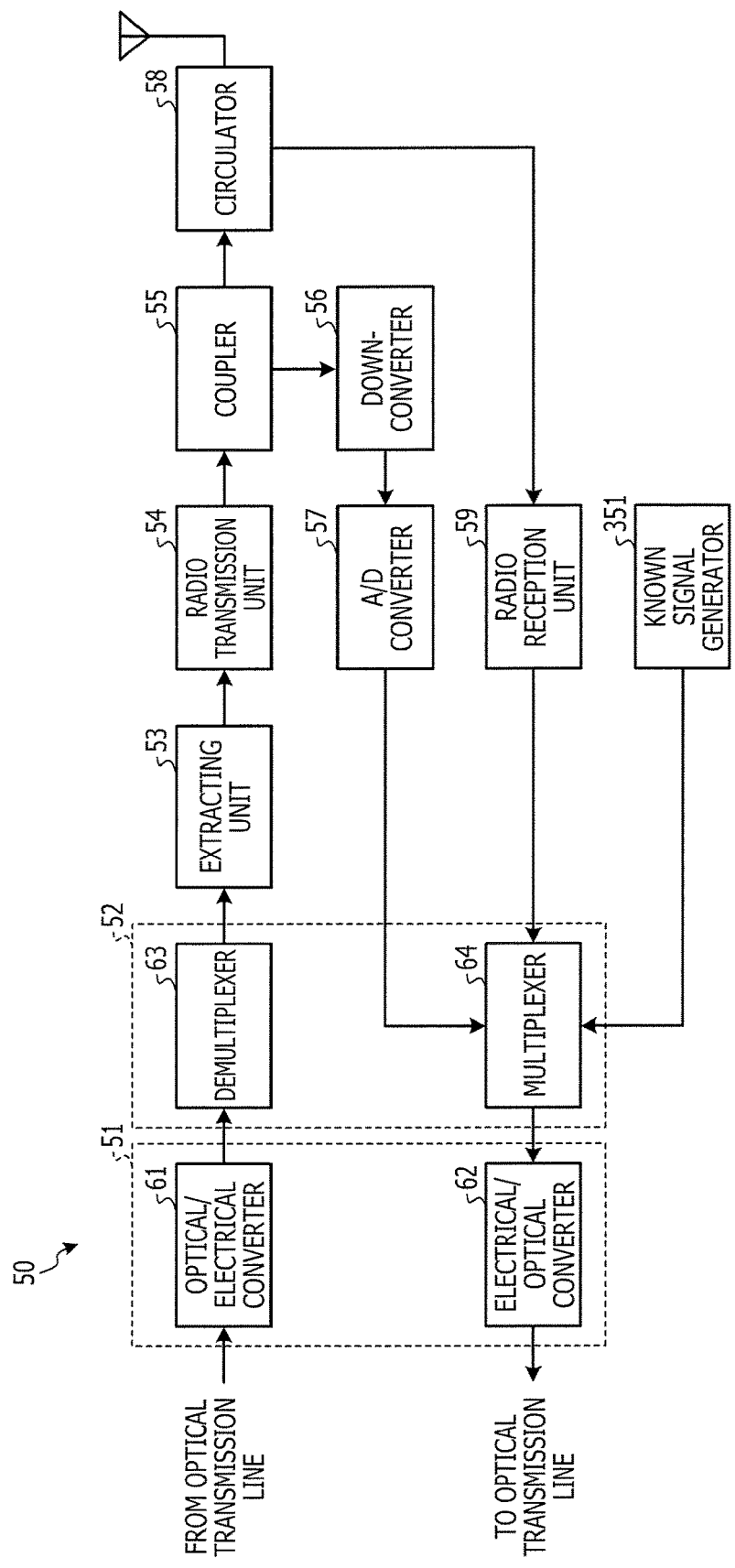
FIG. 13 is a block diagram illustrating one example of a wireless device of the fourth embodiment.

FIG. 13 is a block diagram illustrating one example of a wireless device of the fourth embodiment. In FIG. 13, a configuration relating to the control of whether or not to execute the distortion compensation processing is illustrated in addition to the configuration of the wireless device 50 illustrated in FIG. 4.

In FIG. 13, the wireless device 50 includes a known signal generator 351.

The known signal generator 351 generates the above-described frame synchronization bit and outputs the generated frame synchronization bit to the multiplexer 64. This frame synchronization bit is transmitted by being mapped onto the beginning part of a frame for example.

[Operation Example of Wireless communication system]

Figure 14:
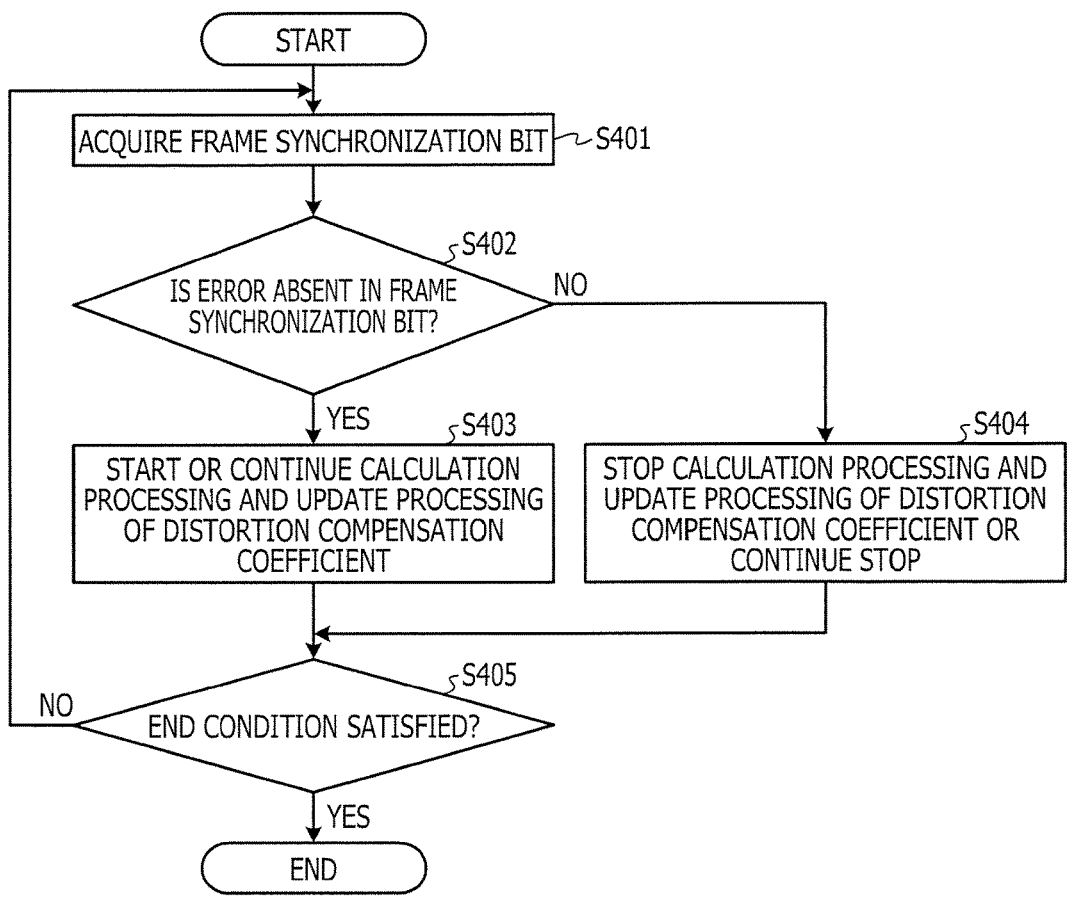
FIG. 14 is a flowchart illustrating one example of a processing operation of a baseband processing device of the fourth embodiment.

One example of a processing operation of a wireless communication system of the fourth embodiment including the above configuration will be described. Here, particularly a processing operation of a baseband processing device will be described. FIG. 14 is a flowchart illustrating one example of a processing operation of a baseband processing device of the fourth embodiment. The baseband processing device performing the processing operation in FIG. 14 may be the baseband processing device 10 illustrated in FIG. 12.

In the baseband processing device 10, the monitoring unit 311 acquires a frame synchronization bit that is transmitted from the wireless device 50 and is extracted in the extracting unit 15 (step S401).

The monitoring unit 311 determines whether an error is absent in the acquired frame synchronization bit (step S402).

If an error is absent in the acquired frame synchronization bit (Yes of step S402), in the state in which the calculation processing and update processing of the distortion compensation coefficient are stopped, the distortion compensation controller 312 starts the calculation processing and update processing. In the state in which the calculation processing and update processing of the distortion compensation coefficient are working, the distortion compensation controller 312 continues the calculation processing and update processing (step S403). The distortion compensation controller 312 may start the calculation processing and update processing of the distortion compensation coefficient if an error is absent in the frame synchronization bits of plural frames for example.

If an error is present in the acquired frame synchronization bit (No of step S402), in the state in which the calculation processing and update processing of the distortion compensation coefficient are working, the distortion compensation controller 312 stops the calculation processing and update processing. In the state in which the calculation processing and update processing of the distortion compensation coefficient are stopped, the distortion compensation controller 312 continues the stop of the calculation processing and update processing (step S404).

The processing of step S401 to step S404 is repeatedly executed if an end condition is not satisfied (No of step S405). If the end condition is satisfied (Yes of step S405), the processing flow of FIG. 14 ends. The end condition is that the power supply of the baseband processing device 10 is turned OFF for example.

As described above, according to the present embodiment, in the baseband processing device 10, the monitoring unit 311 monitors the frame synchronization bit transmitted from the wireless device 50. Then, if an error is detected in the frame synchronization bit by the monitoring unit 311, the distortion compensation controller 312 stops the calculation processing and update processing of the distortion compensation coefficient in the distortion compensating unit 12.

This configuration of the baseband processing device 10 can stop the calculation processing and update processing in a situation in which the calculation accuracy of the distortion compensation coefficient is lowered, and thus can reduce the lowering of the accuracy of the distortion compensation processing.

[Other Embodiments]

[1] The distortion compensating units 12 of the first embodiment to the fourth embodiment may adjust the distortion compensation coefficient according to the temperature of the wireless device 50.

[2] The configurations of the baseband processing devices 10 described in each of the first embodiment to the fourth embodiment may all be provided in one baseband processing device 10. Furthermore, the configurations of the wireless devices 50 described in each of the first embodiment to the fourth embodiment may all be provided in one wireless device 50.

[3] The frame synchronization processing and the delay correction control processing described in the second embodiment and the third embodiment may be executed in one series of flow. That is, the frame synchronization processing and the delay correction control processing may be executed in that order.

[4] The respective constituent elements of the respective units illustrated in the drawings in the first embodiment to the fourth embodiment do not necessarily need be configured as illustrated in the drawings physically. That is, specific forms of distribution and integration of the respective units are not limited to the illustrated forms and all or part of the respective units can be configured to be distributed or integrated functionally or physically in an arbitrary unit according to various kinds of loads, the status of use, and so forth.

Moreover, all or an arbitrary part of various kinds of processing functions carried out in the respective devices may be carried out on a central processing unit (CPU) or a microcomputer such as a micro processing unit (MPU) or a micro controller unit (MCU). Furthermore, all or an arbitrary part of the various kinds of processing functions may be carried out on a program analyzed and executed on a CPU or a microcomputer such as an MPU or an MCU or on hardware based on wired logic.

The baseband processing devices 10 and the wireless devices 50 of the first embodiment to the fourth embodiment can be implemented by the following hardware configurations for example.

Figure 15:
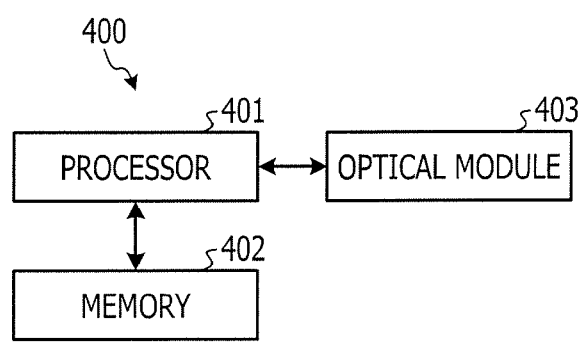
FIG. 15 is a diagram illustrating a hardware configuration example of a baseband processing device.

FIG. 15 is a diagram illustrating a hardware configuration example of a baseband processing device. As illustrated in FIG. 15, a baseband processing device 400 includes a processor 401, a memory 402, and an optical module 403. Examples of the processor 401 include a CPU, a digital signal processor (DSP), a field programmable gate array (FPGA), and so forth. Examples of the memory 402 include a random access memory (RAM) such as a synchronous dynamic random access memory (SDRAM), a read only memory (ROM), a flash memory, and so forth.

Furthermore, the various kinds of processing functions carried out in the baseband processing devices 10 of the first embodiment to the fourth embodiment may be implemented through execution of programs stored in various kinds of memories such as a non-volatile storage medium by a processor. That is, programs corresponding to each processing executed by the baseband unit 11, the distortion compensating unit 12, the high-speed serial interface unit 13, the extracting unit 15, the link-up controller 111, the reference clock generators 112 and 115, the frame correction controller 113, the frame pulse generators 114 and 116, the frame correcting unit 117, the known signal generator 211, the round-trip time calculator 212, the delay amount correcting unit 213, the monitoring unit 311, and the distortion compensation controller 312 may be recorded in the memory 402 and the respective programs may be executed in the processor 401. The optical interface unit 14 is implemented by the optical module 403.

Although it is assumed here that the various kinds of processing functions carried out in the baseband processing devices 10 of the first embodiment to the fourth embodiment are carried out by the one processor 401, the configuration is not limited thereto and the processing functions may be carried out by plural processors.

Figure 16:
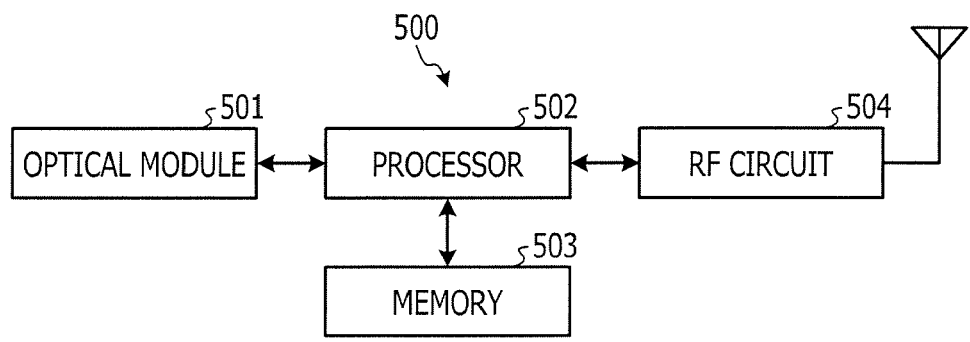
FIG. 16 is a diagram illustrating a hardware configuration example of a wireless device.

FIG. 16 is a diagram illustrating a hardware configuration example of a wireless device. As illustrated in FIG. 16, a wireless device 500 includes an optical module 501, a processor 502, a memory 503, and a radio frequency (RF) circuit 504. Examples of the processor 502 include a CPU, a DSP, an FPGA, and so forth. Examples of the memory 503 include a RAM such as an SDRAM, a ROM, a flash memory, and so forth.

Furthermore, the various kinds of processing functions carried out in the wireless devices 50 of the first embodiment to the fourth embodiment may be implemented through execution of programs stored in various kinds of memories such as a non-volatile storage medium by a processor. That is, programs corresponding to each processing executed by the high-speed serial interface unit 52, the extracting unit 53, the link-up controller 151, the reference clock generators 152 and 155, the frame correction controller 153, the frame pulse generators 154 and 156, the frame correcting unit 157, and the known signal generator 351 may be recorded in the memory 503 and the respective programs may be executed in the processor 502. The wireless transmission unit 54, the coupler 55, the down-converter 56, the A/D converter 57, the circulator 58, and the wireless reception unit 59 are implemented by the RF circuit 504. The optical interface unit 51 is implemented by the optical module 501.

Although it is assumed here that the various kinds of processing functions carried out in the wireless devices 50 of the first embodiment to the fourth embodiment are carried out by the one processor 502, the configuration is not limited thereto and the processing functions may be carried out by plural processors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
   a baseband processing device configured to transmit a data signal via an optical transmission line; and
   a wireless device configured to receive the data signal via the optical transmission line and carry out wireless transmission of an output signal obtained by amplifying the data signal,
   wherein the wireless device includes:
   a radio frequency circuit configured to amplify the data signal to generate the output signal,
   a first memory, and
   a first processor coupled to the first memory and configured to:
      generate a feedback signal according to the output signal generated by the radio frequency circuit,
      transmit the feedback signal to the baseband processing device via the optical transmission line, and
      execute first count processing to generate a first count value, and
   wherein the baseband processing device includes:
   a second memory, and
   a second processor coupled to the second memory and configured to:
      acquire the feedback signal from the wireless device,
      execute first processing of multiplying the data signal by a distortion compensation coefficient corresponding to an inverse characteristic of distortion in the radio frequency circuit based on the feedback signal,
      execute second count processing to generate a second count value,
      correct the second count value based on the first count value, and
      output a first frame timing signal in the baseband processing device based on the corrected second count value.

2. The wireless communication system according to claim 1, wherein the second processor is configured to transmit the second count value to the wireless device.

3. The wireless communication system according to claim 1, wherein the first processor is configured to transmit the first count value to the baseband processing device.

4. The wireless communication system according to claim 2, wherein the first processor is configured to:
   correct the first count value based on the second count value, and
   output a second frame timing signal in the wireless device based on the corrected first count value.

5. The wireless communication system according to claim 1, wherein the second processor is configured to:
   receive a first known signal transmitted from the wireless device via the optical transmission line, and
   stop processing of updating the distortion compensation coefficient when an error is detected in the first known signal.

6. A baseband processing device configured to transmit a data signal to a wireless device via an optical transmission line and receive a feedback signal according to an output signal generated through amplification of the data signal in the wireless device from the wireless device via the optical transmission line, the wireless device being configured to execute first count processing to generate a first count value, and
   the baseband processing device comprising:
   a memory; and
   a processor coupled to the memory and configured to:
      receive the feedback signal from the wireless device,
      execute first processing of multiplying the data signal by a distortion compensation coefficient corresponding to an inverse characteristic of distortion in a wireless frequency circuit on a basis of the feedback signal,
      execute second count processing to generate a second count value,
      correct the second count value based on the first count value, and
      output a first frame timing signal in the baseband processing device based on the corrected second count value.

7. The baseband processing device according to claim 6, wherein the processor is configured to transmit the second count value to the wireless device.

8. The baseband processing device according to claim 6, wherein the wireless device is configured to transmit the first count value to the baseband processing device.

9. The baseband processing device according to claim 7, wherein the wireless device is configured to:
   correct the first count value based on the second count value, and
   output a second frame timing signal in the baseband processing device based on the corrected second count value.

10. The baseband processing device according to claim 6, wherein the processor is configured to:
    receive a first known signal transmitted from the wireless device via the optical transmission line, and
    stop processing of updating the distortion compensation coefficient when an error is detected in the first known signal.

11. A wireless device configured to receive a data signal from a baseband processing device via an optical transmission line and carry out wireless transmission of an output signal obtained by amplifying the data signal, the baseband processing device being configured to execute first count processing to generate a first count value, the wireless device comprising:
    a radio frequency circuit configured to amplify the data signal to generate the output signal;
    a memory; and a processor coupled to the memory and configured to:
generate a feedback signal according to the output signal generated by the radio frequency circuit,
transmit the feedback signal to the baseband processing device via the optical transmission line,
execute second count processing to generate a second count value,
correct the second count processing based on the first count value, and
output a first frame timing signal in the wireless device based on the corrected second count value.

12. The wireless device according to claim 11, wherein the processor is configured to transmit the second count value to the baseband processing device.

13. The wireless device according to claim 12, wherein the processor is configured to:
correct the second count value based on the first count value, and
output a second frame timing signal in the wireless device based on the corrected second count value.

14. The wireless device according to claim 11, wherein the baseband processing device is configured to transmit the first count value to the wireless device.

15. The wireless device according to claim 11, wherein the baseband processing device is configured to:
receive a first known signal transmitted from the wireless device via the optical transmission line, and
stop processing of updating the distortion compensation coefficient when an error is detected in the first known signal.

* * * * *